(12) United States Patent
Zhou

(10) Patent No.: US 8,234,560 B1
(45) Date of Patent: Jul. 31, 2012

(54) TECHNIQUE FOR GENERATING A SET OF INTER-RELATED DOCUMENTS

(75) Inventor: Qingnan Zhou, Vancouver (CA)

(73) Assignee: Google Inc., Mountain View, CA (US)

( * ) Notice: Subject to any disclaimer, the term of this patent is extended or adjusted under 35 U.S.C. 154(b) by 412 days.

(21) Appl. No.: 12/426,108

(22) Filed: Apr. 17, 2009

(51) Int. Cl.
*G06F 17/00* (2006.01)

(52) U.S. Cl. ........ 715/206; 707/822; 707/828; 707/821; 707/829; 715/783

(58) Field of Classification Search ............... 715/208, 715/234, 243, 206; 707/783
See application file for complete search history.

(56) References Cited

U.S. PATENT DOCUMENTS

| | | | | |
|---|---|---|---|---|
| 6,105,044 | A * | 8/2000 | DeRose et al. ............... 715/234 |
| 6,538,673 | B1 * | 3/2003 | Maslov ........................ 715/853 |
| 6,725,423 | B1 * | 4/2004 | Muramoto et al. .......... 715/206 |
| 6,816,891 | B1 * | 11/2004 | Vahalia et al. ............... 709/214 |
| 6,910,049 | B2 * | 6/2005 | Fenton et al. ...................... 1/1 |
| 7,401,287 | B2 * | 7/2008 | Suzuki ......................... 715/208 |
| 7,505,990 | B2 * | 3/2009 | Krishna et al. ..................... 1/1 |
| 7,644,356 | B2 * | 1/2010 | Atkins et al. ................. 715/243 |
| 7,912,859 | B2 * | 3/2011 | Takashima ................... 707/783 |
| 2004/0139410 | A1 * | 7/2004 | Ghameshlu et al. ............ 716/6 |
| 2005/0050029 | A1 * | 3/2005 | Suzuki ............................ 707/3 |
| 2005/0289159 | A1 * | 12/2005 | Hadley et al. ................ 707/100 |
| 2005/0289161 | A1 * | 12/2005 | Hadley et al. ................ 707/100 |
| 2008/0320023 | A1 * | 12/2008 | Fong ............................ 707/101 |
| 2010/0023548 | A1 * | 1/2010 | Slott et al. ................... 707/102 |

* cited by examiner

*Primary Examiner* — Adam M Queler
*Assistant Examiner* — Aaron Johnson
(74) *Attorney, Agent, or Firm* — Sterne, Kessler, Goldstein and Fox P.L.L.C.

(57) ABSTRACT

Embodiments of a computer system, a method and a computer-program product (e.g., software) for use with the computer system are described. These embodiments may be used to generate a set of inter-related documents. In particular, using a random or pseudorandom number generator and a translation list, an interconnected set of documents are created that are arranged in a hierarchy (such as a tree structure). The documents in this set are both deterministic and include a finite amount of variation. These properties may facilitate reproducible testing of technology related to networks, such as the Internet.

26 Claims, 4 Drawing Sheets

TECHNIQUE FOR GENERATING A SET OF INTER-RELATED DOCUMENTS

BACKGROUND

1. Field

The present embodiments relate to techniques for generating a set of inter-related documents, and in particular, for generating a set of inter-related documents for use in testing network-related Internet technologies.

2. Related Art

Online products and services are increasingly popular. However, as networks, such as the Internet, become progressively more complicated, it is becoming more difficult for developers to ensure that new products and services, as well as revisions to existing products and services, operate correctly and are reliable. Consequently, realistic testing of these products and services prior to deployment is critical.

Existing techniques for testing network products and services often use real documents on the Internet (such as websites and web pages) or randomly generated documents (which mimic websites and web pages). However, actual websites and web pages are poorly controlled (for example, they may be regularly updated or changed), which makes it difficult to reproduce testing results during the development process. In addition, a very large number of randomly generated documents may need to be used in order to cover a representative range of variation in the documents. Consequently, randomly generated documents often require excessive amounts of memory. For example, during a cross-validation test, there may be millions of possible document combinations, which typically occupy a significant amount of memory, thereby increasing the testing cost and complexity.

SUMMARY

One embodiment provides a computer system that creates documents in a hierarchy. During operation, the computer system generates a root number which corresponds to a base level in the hierarchy. For example, the root number may be generated using a pseudorandom number generator based at least in part on a seed. Then, the computer system assigns document numbers to the documents (such as integers that are between or equal to one and a total number of documents), where the document numbers are generated based at least in part on the root number, and assigns directory numbers to directories in the hierarchy. Note that a given directory number is generated based at least in part on a given document number, and a given directory is in a branch that is coupled to the root level.

Moreover, the computer system determines paths in the hierarchy corresponding to the document numbers and the directory numbers, where a given path includes the base level and zero or more dependent branches. For example, the zero or more dependent branches corresponding to the paths may be determined recursively from the root number. In some embodiments, the zero or more dependent branches corresponding to the given path are further determined based at least in part on a total number of branches in the hierarchy and a directory number of an immediately preceding document in the hierarchy.

Additionally, the computer system generates content numbers for the documents based at least in part on the corresponding paths through the hierarchy, and creates the documents by translating digits in the content numbers based at least in part on a translation document. For example, a given content number may be generated using a pseudorandom number generator using a path number corresponding to the given path through the hierarchy as a seed. Furthermore, the translation document may include words, audio and/or video.

In some embodiments, the computer system adds punctuation marks to the documents based at least in part on one or more factors of the content numbers. Additionally or separately, the computer system may add links to the documents (such as hyperlinks) based at least in part on one or more factors of the content numbers, where a given link defines a relationship between a given document in the hierarchy and one or more additional documents in another hierarchy.

These documents may include a finite number of permutations for use in testing an Internet technology, such as a web crawler. For example, the documents may correspond to interconnected websites and web pages, and the paths through the hierarchy may correspond to uniform resource locators.

Another embodiment provides a method including at least some of the above-described operations that are performed by the computer system (and, more generally, by an electronic device, such as an integrated circuit).

Another embodiment provides a computer-program product for use in conjunction with the computer system. This computer-program product may include instructions corresponding to at least some of the above-described operations that are performed by the computer system.

BRIEF DESCRIPTION OF THE FIGURES

Note that like reference numerals refer to corresponding parts throughout the drawings.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present disclosure is not intended to be limited to the embodiments shown, but is to be accorded the widest scope consistent with the principles and features disclosed herein.

Embodiments of a computer system, a method and a computer-program product (e.g., software) for use with the computer system are described. These embodiments may be used to generate a set of inter-related documents. In particular, using a random or pseudorandom number generator and a translation list, an interconnected set of documents are created that are arranged in a hierarchy (such as a tree structure). The documents in this set are both deterministic and include a finite amount of variation.

These properties may facilitate accurate and reproducible testing of technology, products or services for use in networks, such as the Internet, without requiring excessive memory, cost or complexity. For example, the set of documents can be used to test web crawlers, which scrape content from websites and web pages on the Internet for use in a repository for a search engine. In particular, the deterministic nature of the set of documents allows the test results to be reproduced multiple times during an iterative development process, while the variation among the documents allows various use cases to be studied in order to confirm that the web crawler operates correctly in a diverse environment, such as the Internet.

Figure 1:
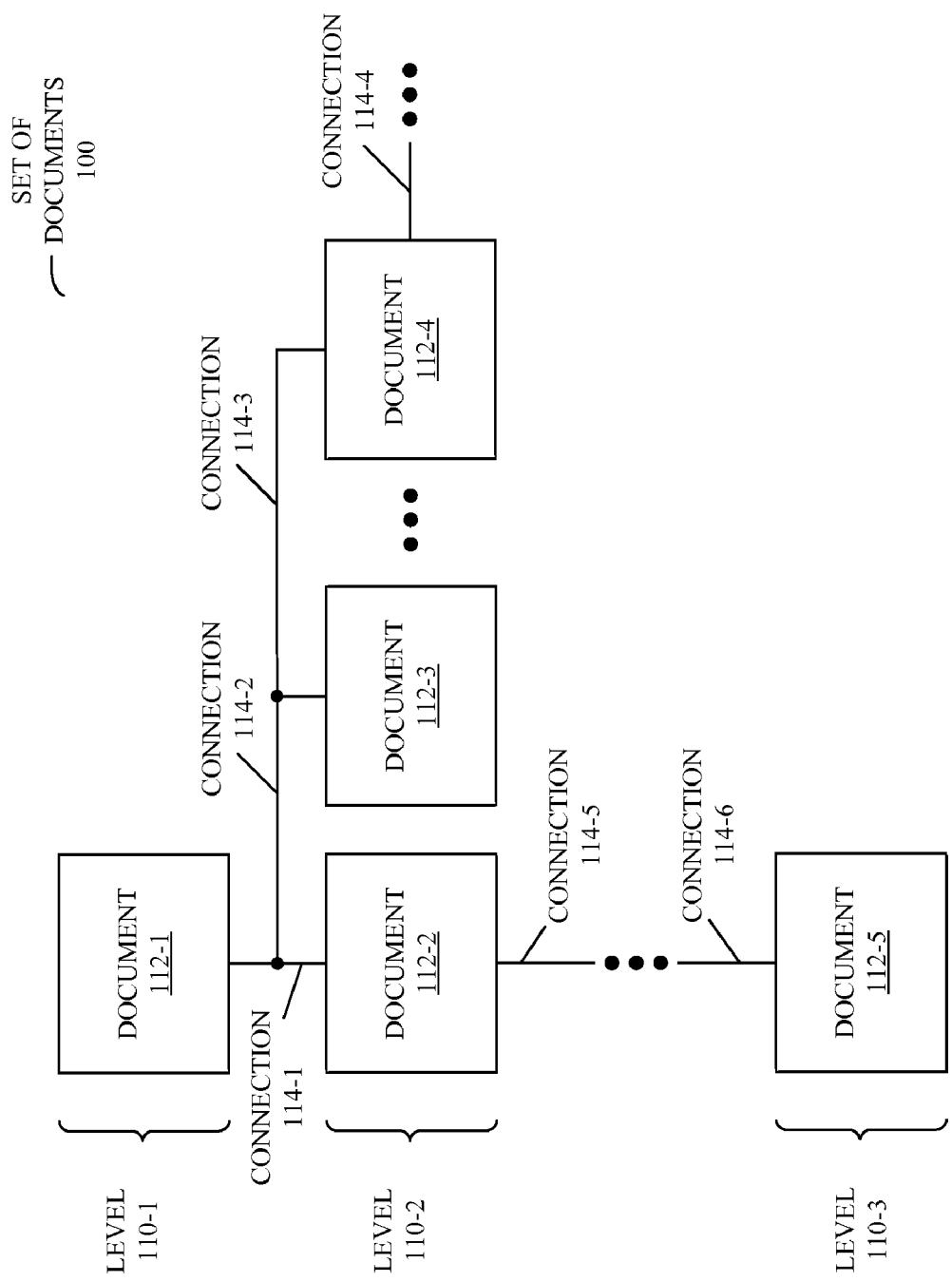
FIG. 1 is a block diagram illustrating an embodiment of a set of inter-related documents in a hierarchy.

We now describe embodiments of a process for creating the set of documents. FIG. 1 presents a block diagram illustrating an embodiment of a set of documents 100 in a hierarchy. This hierarchy includes multiple levels 110, and each level has one or more documents 112. Moreover, the documents in a given level and/or between levels 110 are coupled by connections 114. In addition, some of the documents, such as document 112-4, may be coupled to one or more additional hierarchies (i.e., one or more additional sets of documents) by connections, such as connection 114-4.

This hierarchy, with its various branches (or paths) and nodes, is sometimes referred to as a tree structure. It is representative of the topology of websites and web pages on networks, such as the Internet and/or an intranet. In particular, a given set of documents, such as set of documents 100, may correspond to one or more websites, and the inter-related or interconnected documents 112 in the set of documents 100 may correspond to multiple, cascaded web pages that are included on these web sites. Therefore, starting at a root level 110-1, levels 110 may represent parent-child dependencies among these web pages, connections 114 may represent hyperlinks, and the paths through the hierarchy may represent uniform resource locators or URLs. In the discussion that follows, a given path through multiple levels 110 of the hierarchy, such as from document 112-1 to document 112-5, is sometimes referred to as a branch. Moreover, a 'parent' document in a given branch is sometimes referred to as a directory, and one or more 'child' documents, which are coupled to this parent document, are sometimes referred to as subdirectories. Furthermore, a given subdirectory of the parent document is referred to as a 'directory' for its dependent subdirectories.

As discussed previously, realistic testing of technologies, products or services for use on a network, such as the Internet, depends, in part, on the set of documents that are used in the testing. In the discussion that follows, a technique for creating or generating a suitable set of documents is described. This set of documents has several useful properties, including: systematic variation of parameters (which is useful in testing a wide variety of behaviors); determinism (so that a set of documents with the same systematic variation can be subsequently generated, if needed, which allows test results to be replicated); and being bounded (so the amount of memory needed to store the set of documents is reduced, thereby reducing the cost and complexity of the testing).

Figure 2:
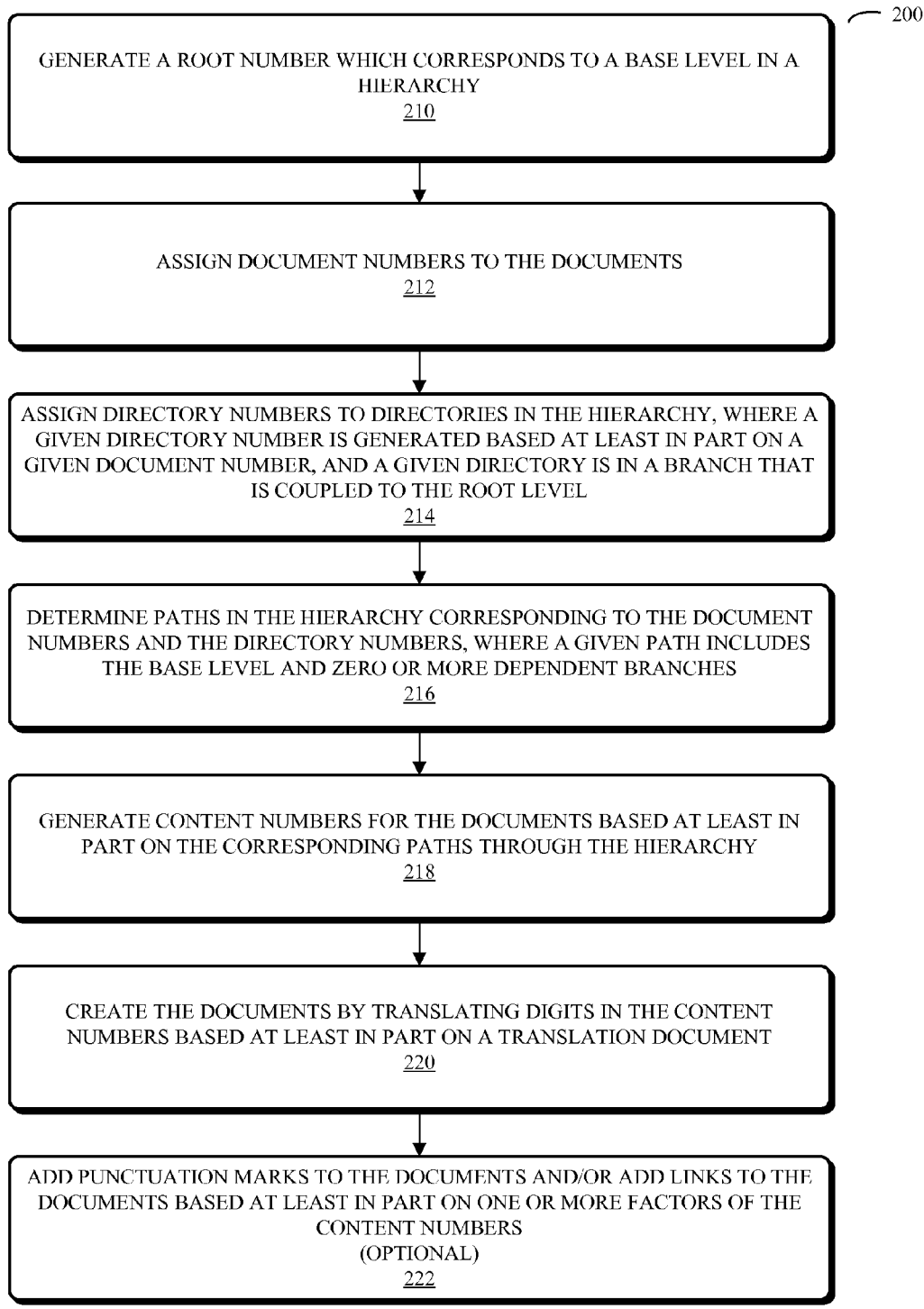
FIG. 2 is a flowchart illustrating an embodiment of a process for creating documents in a hierarchy.

FIG. 2 presents a flowchart illustrating an embodiment of a process 200 for creating documents in a hierarchy, which may be performed by a computer system. During operation, the computer system generates a root number which corresponds to a base level in the hierarchy (210). For example, the root number may be generated using a pseudorandom number generator based at least in part on a seed. Then, the computer system assigns document numbers to the documents (212) (such as integers that are between or equal to one and a total number of documents n), where the document numbers are generated based at least in part on the root number, and assigns directory numbers to directories in the hierarchy (214). Note that a given directory number is generated based at least in part on a given document number, and a given directory is in a branch that is coupled to the root level.

Moreover, the computer system determines paths in the hierarchy corresponding to the document numbers and the directory numbers (216), where a given path includes the base level and zero or more dependent branches. For example, the zero or more dependent branches corresponding to the paths may be determined recursively from the root number. In some embodiments, the zero or more dependent branches corresponding to the given path are further determined based at least in part on a total number of branches in the hierarchy and a directory number of an immediately preceding document in the hierarchy.

Additionally, the computer system generates content numbers for the documents based at least in part on the corresponding paths through the hierarchy (218), and creates the documents by translating digits in the content numbers based at least in part on a translation document (220). For example, a given content number may be generated using a pseudorandom number generator using a path number corresponding to the given path through the hierarchy as a seed. Furthermore, the translation document may include words (or a word list, such as a dictionary), audio and/or video.

In some embodiments, the computer system optionally adds punctuation marks to the documents based at least in part on one or more factors of the content numbers (222). Additionally or separately, the computer system may optionally add links to the documents (such as hyperlinks) based at least in part on one or more factors of the content numbers (222), where a given link defines a relationship between a given document in the hierarchy and one or more additional documents in another hierarchy. More generally, based at least in part on the one or more factors of the content numbers, the computer system may perform an arbitrary modification to the documents, including: one or more bold characters, one or more italic characters and/or one or more underlines.

As noted previously, these documents may include a finite number of permutations or variations in parameters for use in testing an Internet technology, such as a web crawler. For example, the documents may correspond to interconnected websites and web pages, and the paths through the hierarchy may correspond to URLs. Thus, in some embodiments, the content of the documents may correspond to HyperText Markup Language (HTML) and/or Extensible Markup Language (XML).

Note that process 200 may include additional or fewer operations. Moreover, the order of the operations may be changed, and/or two or more operations may be combined into a single operation.

In an exemplary embodiment, paths through the hierarchy are between directories and subdirectories (i.e., levels 110 in FIG. 1). The root directory number is generated by the pseudorandom number generator using a user-specified seed (such as a 32-bit number). Then, numbers are assigned to each document and additional numbers are assigned to each directory and subdirectory. In particular, the document numbers are between 1 and n (if n documents are being generated). In some embodiments, each subdirectory number depends on the directory number of its parent directory. These interrelationships or interconnections between the documents (i.e., the paths in the hierarchy, which correspond to the URLs of web pages) may be determined using a deterministic calculation. For example, for a given document, the path may be determined using (document number mod directory number) mod number of subdirectories, where mod is the modulus and the number of subdirectories may be specified by a user (or may be pseudorandomly generated). This path specifies whether or not the given document is in a directory or one of its subdirectories. By applying this formula recursively, starting with the root directory number, paths through the hierarchy can be determined.

However, in some embodiments, the (sub-) directory numbers are, at least in part, pseudorandomly generated. For example, suppose a given document has document number p. The path from the root directory to this document can be determined using the property that a pseudorandom number generator will generate the same sequence of numbers when given the same seed. Using p as the seed, the pseudorandom number generator may generate the numbers 3, 9, 4, 6, 0, etc. In this case, '3' becomes the subdirectory number directly under the root directory. Moreover, using the modulus equation, the next number generated, '9,' is checked to determine whether document p is directly under subdirectory 3 or one of its subdirectories. If the number '9' indicates that document p is under the first subdirectory of subdirectory 3, and it also indicates that subdirectory 3 only has one subdirectory, then the next number generated, '4,' is assigned as the directory number for this subdirectory. Furthermore, using the modulus equation, the next number generated, '6,' is checked to determine whether document p is directly under subdirectory 4 or not. If yes, then the whole path through the hierarchy for document p is /3/4/p.

After the paths are determined, content is generated for each document. In particular, for a given document number, a content number corresponding to the document contents is pseudorandomly generated using the path as the seed in the pseudorandom number generator. This content number is translated into a string using a user-specified translation list (such as a word list or a dictionary). In some embodiments, the translation list includes audio and/or video, which is substituted into the given document for certain digits in the content numbers. Furthermore, punctuation marks and/or additional connections (which correspond to hyperlinks) may be added to certain documents if the content numbers for these documents have certain integer factors. The result of this process is a set of interconnected documents, such as 10 million interconnected documents, that include a finite number of deterministic permutations or variations in factors such as: the content, the number of sub-directories and/or the paths through the hierarchy.

Figure 3:
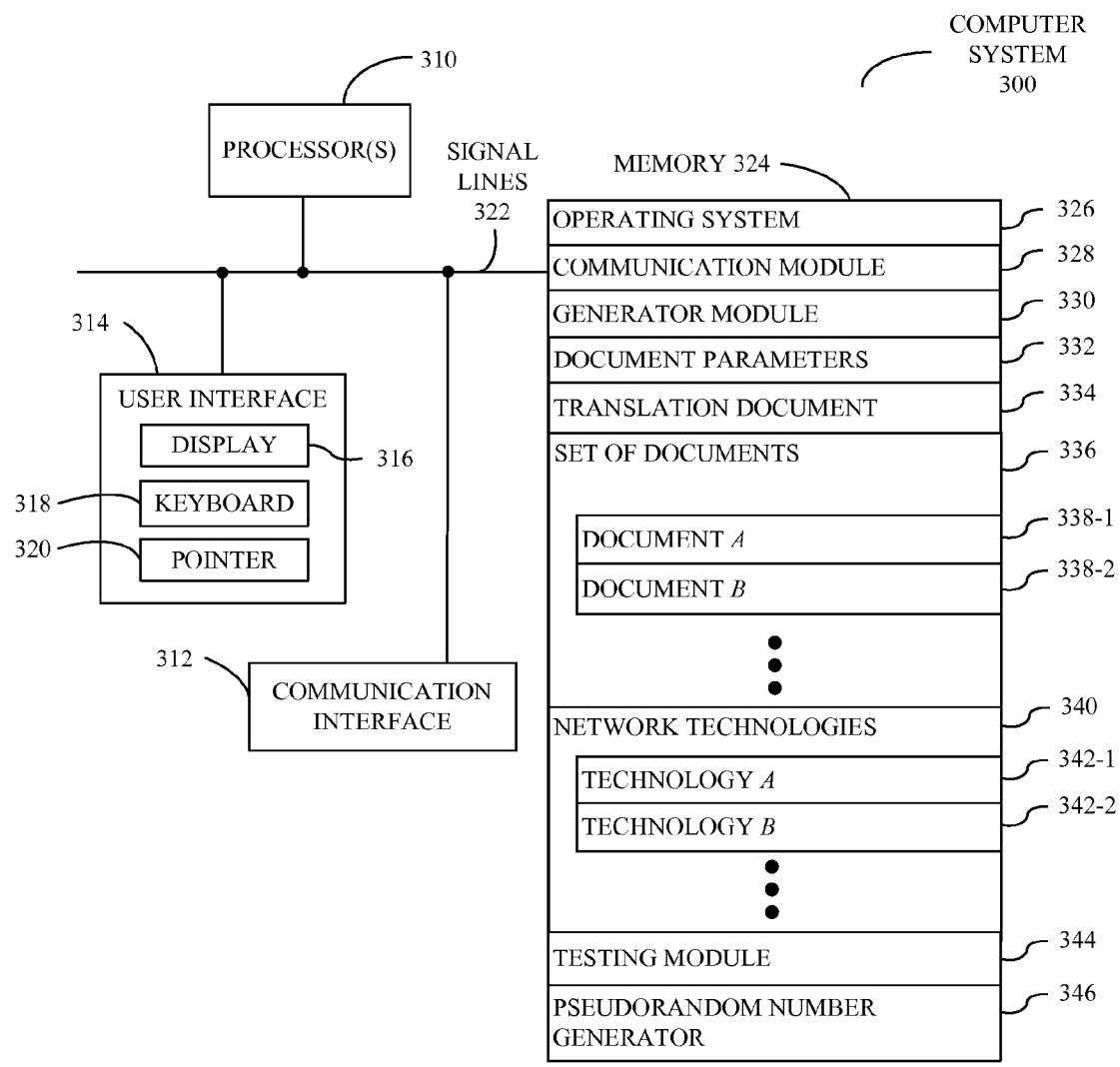
FIG. 3 is a block diagram illustrating an embodiment of a computer system that creates documents in a hierarchy.

We now describe embodiments of the computer system that may be used to create documents in a hierarchy. FIG. 3 presents a block diagram illustrating an embodiment of a computer system 300 that creates documents in a hierarchy. Computer system 300 includes: one or more processors 310, a communication interface 312, a user interface 314, and one or more signal lines 322 coupling these components together. Note that the one or more processing units 310 may support parallel processing and/or multi-threaded operation, the communication interface 312 may have a persistent communication connection, and the one or more signal lines 322 may constitute a communication bus. Moreover, the user interface 314 may include: a display 316, a keyboard 318, and/or a pointer 320, such as a mouse.

Memory 324 in the computer system 300 may include volatile memory and/or non-volatile memory. More specifically, memory 324 may include: ROM, RAM, EPROM, EEPROM, flash, one or more smart cards, one or more magnetic disc storage devices, and/or one or more optical storage devices. Memory 324 may store an operating system 326 that includes procedures (or a set of instructions) for handling various basic system services for performing hardware-dependent tasks. While not shown in FIG. 3, the operating system 326 may include a web browser (or set of instructions) for providing and/or rendering information in web pages. Memory 324 may also store communications procedures (or a set of instructions) in a communication module 328. These communication procedures may be used for communicating with: one or more computers, devices and/or servers, including computers, devices and/or servers that are remotely located with respect to the computer system 300. Furthermore, the communication may occur via a network, such as: the Internet or World Wide Web (WWW), an intranet, a local area network (LAN) (such as IEEE 802.11 or WiFi), a wide area network (WAN) (such as IEEE 802.16 or WiMAX), a metropolitan area network (MAN), a satellite network, a wireless network (such as a cellular telephone network), an optical network, and/or a combination of networks or other technology enabling communication between computing systems or electronic devices.

Memory 324 may also include one or more program modules (or a set of instructions), including: generator module 330 (or a set of instructions) and/or testing module 344 (or a set of instructions). Based on document parameters 332 (such as a number of documents to be generated, a seed and/or a number of subdirectories), generator module 330 generates document numbers, directory numbers and/or content numbers using pseudorandom number generator 346, and calculates paths through a hierarchy (as described previously in process 200 in FIG. 2). Then, generator module 330 translates the content numbers using translation document 334 to produce set of documents 336, such as document A 338-1 and document B 338-2. Subsequently, testing module 344 may use set of documents 336 to test network technologies 340, such as technology A 342-1 and technology B 342-2.

Instructions in the various modules in memory 324 may be implemented in: a high-level procedural language, an object-oriented programming language, and/or in an assembly or machine language. The programming language may be compiled or interpreted, i.e., configurable or configured, to be executed by the one or more processing units 310. Note that one or more of the modules in memory 324 may constitute a computer-program mechanism.

Although the computer system 300 is illustrated as having a number of discrete components, FIG. 3 is intended to be a functional description of the various features that may be present in the computer system 300 rather than a structural schematic of the embodiments described herein. In practice, and as recognized by those of ordinary skill in the art, the functions of the computer system 300 may be distributed over a large number of servers or computers, with various groups of the servers or computers performing particular subsets of the functions.

In some embodiments, some or all of the functionality of the computer system 300 may be implemented in one or more application-specific integrated circuits (ASICs) and/or one or more digital signal processors (DSPs), either or which constitute an electronic device. Moreover, the functionality of computer system 300 may be implemented more in hardware and less in software, or less in hardware and more in software, as is known in the art.

Figure 4:
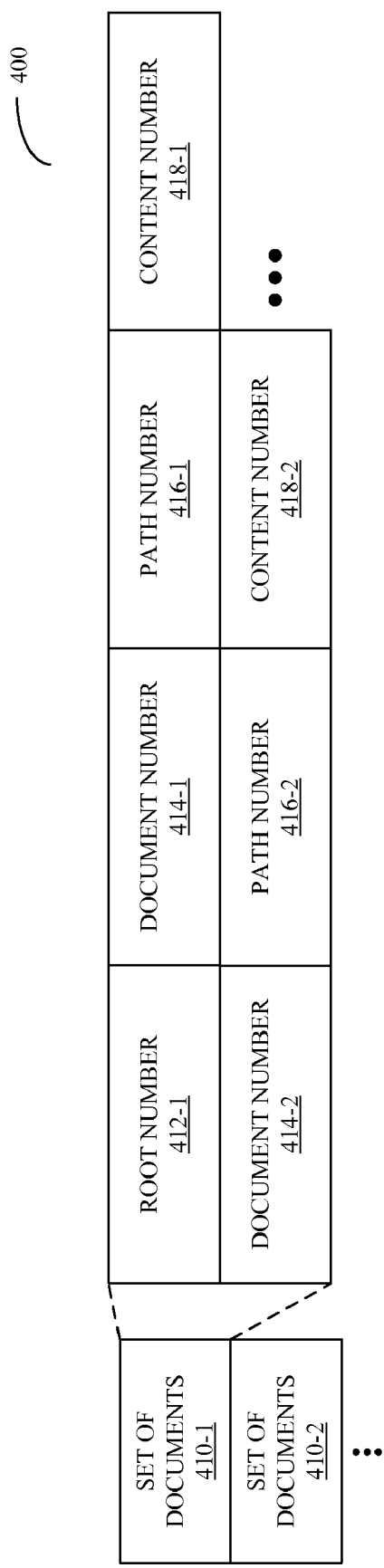
FIG. 4 is a block diagram illustrating an embodiment of a data structure.

We now describe embodiments of a data structure that may be used in computer system 300. FIG. 4 presents a block diagram illustrating an embodiment of a data structure 400. This data structure may include one or more sets of documents 410. For example, set of documents 410-1 may include: root number 412-1, and multiple instances of groups of numbers, such as document number 414-1, path 416-1 and content number 418-1.

Computer system 300 (FIG. 3) and/or data structure 400 may include additional or fewer components. Moreover, two or more components may be combined into a single component, and/or a position of one or more components may be changed.

While the preceding embodiments illustrate the creation or generation of a set of inter-related or interconnected documents for use in testing network technologies, the set of documents may be used to test a wide variety of software applications, including applications that are implemented in a networked environment or in stand-alone systems. For example, the software may include software that is resident on a computer (such as a personal computer) and/or that is implemented using a client-server architecture.

The foregoing descriptions of embodiments have been presented for purposes of illustration and description only. They are not intended to be exhaustive or to limit the present embodiments to the forms disclosed. Accordingly, many modifications and variations will be apparent to practitioners skilled in the art. Additionally, the above disclosure is not intended to limit the present embodiments. The scope of the present embodiments is defined by the appended claims.

What is claimed is:

1. A method for creating documents in a hierarchy using an electronic device, which performs operations in the method, the method comprising:
    generating a root number which corresponds to a base level in the hierarchy;
    assigning document numbers to the documents, wherein the document numbers are generated based at least in part on the root number;
    assigning directory numbers to directories in the hierarchy, wherein a given directory number is generated based at least in part on a given document number, and wherein a given directory is in a branch that is coupled to the root level;
    determining paths in the hierarchy corresponding to the document numbers and the directory numbers, wherein a given path includes the base level and zero or more dependent branches;
    generating content numbers for the documents based at least in part on the corresponding paths through the hierarchy;
    creating the documents, wherein creating the documents comprises translating a content number for each document to determine content to be placed within the document; and
    storing, in a memory, the created documents in the directories in the hierarchy.

2. The method of claim 1, wherein each document number associated with the documents includes a unique integer between and including one and a total number of documents.

3. The method of claim 1, wherein the root number is generated using a pseudorandom number generator based at least in part on a seed.

4. The method of claim 1, wherein the zero or more dependent branches corresponding to the paths are determined recursively from the root number.

5. The method of claim 4, wherein the zero or more dependent branches corresponding to a given path are further determined based at least in part on a total number of branches in the hierarchy and a directory number of an immediately preceding document in the hierarchy.

6. The method of claim 1, wherein the documents include a finite number of permutations for use in testing an Internet technology.

7. The method of claim 6, wherein the Internet technology includes a web crawler.

8. The method of claim 1, wherein the documents correspond to interconnected websites and web pages.

9. The method of claim 8, wherein the paths through the hierarchy correspond to uniform resource locators.

10. The method of claim 1, wherein a given content number is generated using a pseudorandom number generator using a path number corresponding to a given path through the hierarchy as a seed.

11. The method of claim 1, wherein translating a content number for each document to determine content to be placed within the document comprises:
    using the content number to determine one or more of words, audio, and video from a translation list that are to be placed within the document.

12. The method of claim 1, further comprising adding punctuation marks to the documents based at least in part on one or more factors of the content numbers.

13. The method of claim 1, further comprising adding links to the documents based at least in part on one or more factors of the content numbers, wherein a given link defines a relationship between a given document in the hierarchy and one or more additional documents in another hierarchy.

14. The method of claim 13, wherein the given link corresponds to a hyperlink.

15. The method of claim 1, wherein the electronic device includes an Application Specific Integrated Circuit.

16. A computer-program product for use in conjunction with a computer system, the computer-program product comprising a computer-readable storage medium and a computer-program mechanism embedded therein for configuring the computer system to create documents in a hierarchy, the computer-program mechanism including:
    instructions for generating a root number which corresponds to a base level in the hierarchy;
    instructions for assigning document numbers to the documents, wherein the document numbers are generated based at least in part on the root number;
    instructions for assigning directory numbers to directories in the hierarchy, wherein a given directory number is generated based at least in part on a given document number, and wherein a given directory is in a branch that is coupled to the root level;
    instructions for determining paths in the hierarchy corresponding to the document numbers and the directory numbers, wherein a given path includes the base level and zero or more dependent branches;
    instructions for generating content numbers for the documents based at least in part on the corresponding paths through the hierarchy;
    instructions for creating the documents, wherein creating the documents comprises translating a content number for each document to determine content to be placed within the document; and
    instructions for storing, in a memory, the created documents in the directories in the hierarchy.

17. The computer-program product of claim 16, wherein each document number associated with the documents includes a unique integer between and including one and a total number of documents.

18. The computer-program product of claim 16, wherein the root number is generated using a pseudorandom number generator based at least in part on a seed.

19. The computer-program product of claim 16, wherein the zero or more dependent branches corresponding to the paths are determined recursively from the root number.

20. The computer-program product of claim 16, wherein the documents include a finite number of permutations for use in testing an Internet technology.

21. The computer-program product of claim 16, wherein the documents correspond to interconnected websites and web pages.

22. The computer-program product of claim 16, wherein a given content number is generated using a pseudorandom number generator using a path number corresponding to a given path through the hierarchy as a seed.

23. The computer-program product of claim 16, further comprising adding punctuation marks to the documents based at least in part on one or more factors of the content numbers.

24. The computer-program product of claim 16, further comprising adding links to the documents based at least in part on one or more factors of the content numbers, wherein a given link defines a relationship between a given document in the hierarchy and one or more additional documents in another hierarchy.

25. A computer system, comprising:
  a processor;
  memory;
  a program module, wherein the program module is stored in the memory and configured to be executed by the processor, the program module including:
  instructions for generating a root number which corresponds to a base level in the hierarchy;
  instructions for assigning document numbers to the documents, wherein the document numbers are generated based at least in part on the root number;
  instructions for assigning directory numbers to directories in the hierarchy, wherein a given directory number is generated based at least in part on a given document number, and wherein a given directory is in a branch that is coupled to the root level;
  instructions for determining paths in the hierarchy corresponding to the document numbers and the directory numbers, wherein a given path includes the base level and zero or more dependent branches;
  instructions for generating content numbers for the documents based at least in part on the corresponding paths through the hierarchy;
  instructions for creating the documents, wherein creating the documents comprises translating a content number for each document to determine content to be placed within the document; and
  instructions for storing the created documents in the directories in the hierarchy.

26. The computer-program product of claim 16, wherein translating a content number for each document to determine content to be placed within the document comprises:
  using the content number to determine one or more of words, audio, and video from a translation list that are to be placed within the document.

\* \* \* \* \*